Oct. 27, 1936.    L. GOLDHAMMER    2,058,439
CINEMATOGRAPHIC APPARATUS
Filed Dec. 15, 1933

Inventor:
Leo Goldhammer,
By Philip S. Hopkins,
Attorney.

Patented Oct. 27, 1936

2,058,439

UNITED STATES PATENT OFFICE 2,058,439

CINEMATOGRAPHIC APPARATUS

Leo Goldhammer, Munich, Germany, assignor to Agfa Ansco Corporation, Binghamton, N. Y., a corporation of New York Application December 15, 1933, Serial No. 702,638 In Germany December 21, 1932

7 Claims. (Cl. 88—16)

My present invention relates to cinematographic apparatus.

One of its objects is a cinematographic apparatus provided with a device which permits the subdivision of one picture area of normal film into four picture areas. Further objects will be seen from the detailed specification following hereafter.

In order to economize film material it has already been proposed to subdivide films of standard and substandard width so that the area ordinarily reserved for one picture of standard size receives four pictures of a correspondingly smaller size. When taking pictures in this manner, at first half of the film area is exposed while masking the other half, the film being advanced after each exposure by half the height of a standard picture; then the second half of the film which had been masked, is exposed while the film traverses the apparatus in the opposite direction. For reproducing films taken in the aforesaid manner they must be severed along their median line and joined end to end.

According to this invention the troubles involved in severing and joining film strips comprising two rows of pictures one adjacent to the other are overcome by putting in front of the objective of the apparatus for taking, reproducing or printing the pictures, a prism which intermittently is turned by 180° in each step and laterally displaces the rays coming from the object and passing through the objective so that they fall alternately on that half of the film which is to be exposed. In this manner the film strip is continuously subdivided and the exposure may be effected either in a stepped or in a zigzag-formed line. Thus after traversing the apparatus but one time, the subdivided film is perfectly ready for projection.

This new method of subdividing films optically avoids the necessity of changing the direction of travel of the film, of reversing the film magazine and controlling the objective, and, in consequence, dispenses with the means necessary for controlling these manipulations so that they are performed in time and in the correct order of succession. The prism is interconnected with the intermittent feed mechanism and a diaphragm in such a manner that it is intermittently turned by 180° together with the claw advancing the film by half the height of a normal picture, and that the diaphragm intercepts admission of light to the film while these two operations are performed. According as the film may be advanced to follow a stepped or a zigzag line, every stroke of the claw will produce one or two rotary movements of the prism. In this latter case the rotation of the prism occurs simultaneously with each stroke of the claw. The preferred form of diaphragm adopted according to the present invention has a step-shaped aperture and is mounted so as to be capable of oscillation, so that in one oscillation, that is to say when the crankshaft has made one revolution the diaphragm masks the gate completely during the movement of the claw as well as that of the prism.

The accompanying drawing illustrates the present invention.

Figure 1:
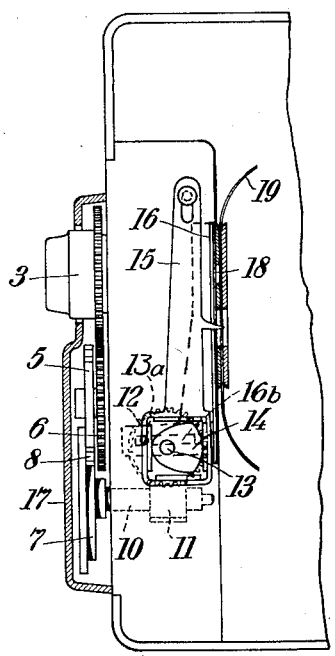
Fig. 1 is a side elevation of a cinematographic apparatus for taking films following a zigzag line, wherein the side wall is broken away so as to lay open the driving means for the prism, the claw and the diaphragm.
Figure 2:
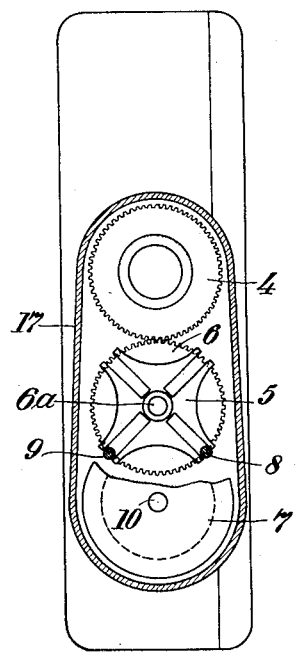
Fig. 2 is a front elevation of the apparatus with the covering cap removed.
Figure 3:
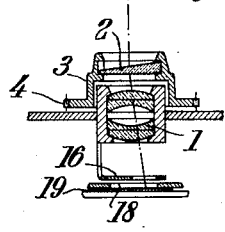
Fig. 3 is a section through the optical elements of the apparatus, the deflection of the path of rays being represented diagrammatically.
Figure 5:
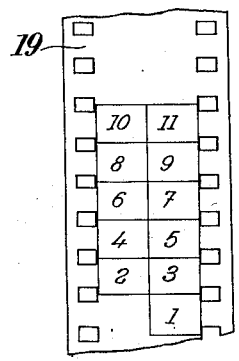
Fig. 5 shows a film with the frames subdivided according to the present invention.
Figure 4A:
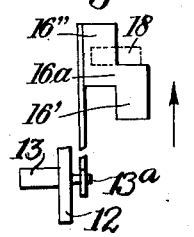
Figs. 4a and 4b show the stepped diaphragm capable of oscillation, Fig. 4b showing the diaphragm of Fig. 4a turned by 90°.
Figure 4B:
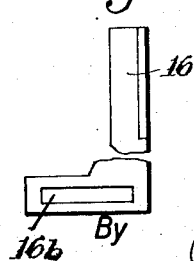

In front of the objective is disposed a wedge-shaped prism 2. The prism 2 is inserted in a mount 3 having a peripheral portion in the form of a gear wheel 4. The mount is intermittently rotated, by 180° in each step, by means of the Geneva 5 which together with a gear wheel 6 is mounted on an axle 6a. The connection between the mount 3 and the Geneva 5 is produced by the gear wheels 4 and 6. The Geneva 5 is driven by a disk 7 provided with two pins 8 and 9. The two pins are necessary in order to turn the prism by 180°, instead of by 90°. The pins 8 and 9 are mounted near the peripheral line and spaced apart by 90°. One whole turn of the disk 7, therefore, produces half a turn of the Geneva and the prism. It is also possible to adopt one pin instead of two, when giving the cog-wheels 4 and 6 a gear ratio of 2 to 1. However, in this case, the maximum of speed, in rotating the prism, will be very great. The pin bearing disk 7 is keyed to the shaft 10, on which the worm gear 11 likewise is fastened. The worm gear 11 engages with the gear wheel 12 mounted on the main driving shaft 13. The driving shaft 13 also carries the heart-shaped eccentric 14 for driving the claw 15. Furthermore the shaft 13 bears a crank pin 13a which actuates the flutter diaphragm 16 capable of reciprocatory movement. The flutter diaphragm 16 is shown in Figs. 4a and 4b. It consists of a piece of sheet metal bent at a right angle; in the upper part there are provided the areas 16a, 16' and 16" for masking the light and in the lower part there is provided the slot 16b. A crank pin 13a is mounted on the shaft 13 and engages the slot 16b. The crank pin 13a and the eccentric 14 are mounted in such a relation that the picture area is masked during the stroke of the claw. 17 is the cap which serves to cover the cog-wheel and the driving means mounted on the front wall of the camera, and 18 is the picture gate. The film 19 is represented in Fig. 5. As shown in this figure, the pictures are taken in such an order of succession that after exposure of the area 1 (see lower right corner) the film is advanced by half the height of a normal picture, while at the same time the medium portion 16a of the diaphragm 16 masks the aperture completely, and the prism is turned by 180° by the Geneva. The next picture, therefore, diagonally adjoins the first (see Fig. 5, No. 2). With the first exposure the diaphragm has moved upwards, so that the right half of the film is obturated by the wing 16'. When the exposure of picture 2 is complete, the diaphragm moves downwards and masks the aperture completely while the prism is moved into its position for taking picture 3. While taking this picture the diaphragm is in its lowest position and covers with its wing 16" the picture field 2, so that the exposure of picture 3 may be effected. Then the film is advanced again by half the height of a normal picture, the prism is turned by 180° and picture 4 is ready for exposure. This kind of taking small-sized pictures illustrating the zigzag method above referred to, is then continued throughout the length of film to be exposed.

What I claim is:

1. In a cinematographic apparatus in combination an objective tube provided with an objective, a film gate having an aperture for exposing two picture frames, a wedge-shaped refracting prism for deflecting the light rays coming from the object to a predetermined degree, means for rotatably mounting said prism in front and on the axis of said objective tube, means for intermittently rotating said prism 180° to deflect the light passed by the objective to one frame of said aperture, an intermittent feed mechanism for feeding a film through said gate, means for masking said aperture, means for masking each frame of said aperture, means for actuating said masking means and means interconnecting the film feeding mechanism, the prism rotating means and the actuating means of the masking means to mask said aperture while the film is advanced and to mask alternately one frame of said aperture and expose the other frame to light passed by the prism while the film is at rest.

2. In a cinematographic apparatus in combination an objective tube, a film gate having an aperture for exposing two picture frames, a wedge-shaped refracting prism for deflecting light rays to a predetermined degree rotatably mounted on the axis of said objective tube, means for intermittently rotating said prism 180°, means for intermittently feeding a film through said film gate, a main drive shaft interconnected with said prism rotating means and said film feeding means, means for masking the entire aperture and each frame of said aperture in said gate and means connected with said main drive shaft for actuating said masking means to mask said aperture while the film is advanced and the prism is rotated and to mask alternately one frame of said aperture and expose the other frame to light passed by the prism while the film is at rest.

3. In a cinematographic apparatus in combination an objective tube provided with an objective, a wedge-shaped refracting prism for deflecting the light rays coming from the object to a predetermined degree, a mount for said prism rotatably mounted on said objective tube, the outer portion of said mount forming a gear wheel, an axle, a Geneva and a gear wheel mounted on said axle, said gear wheel engaging with said portion of said mount forming a gear wheel, a shaft, a disc mounted on said shaft, two pins mounted on said disc at a distance corresponding with a quarter of the circumference of said disc so as to be capable of engaging said Geneva, a film gate having an aperture for exposing two picture frames, an intermittent feed mechanism for advancing a film through said gate, means for coupling the driving means for said feed mechanism with said shaft, means for masking the aperture in said gate, means for masking each frame of said aperture in said gate, and means connected with said driving means for actuating said masking means to mask the entire aperture while the film is advanced and to alternately mask one frame of said aperture and expose the other frame to light passed by said prism while the film is at rest.

4. In a cinematographic apparatus in combination an objective tube provided with an objective, a wedge-shaped refracting prism for deflecting the light rays coming from the object to a predetermined degree, a mount for said prism rotatably mounted on said objective tube, the outer portion of said mount forming a gear wheel, an axle, a Geneva and a gear wheel mounted on said axle, said gear wheel engaging with said portion of said mount forming a gear wheel, a shaft, a worm gear and a disc mounted on said shaft, two pins mounted on said disc at a distance corresponding with a quarter of the circumference of said disc so as to be capable of engaging said Geneva, a film gate having an aperture for exposing two picture frames, a main driving shaft, a heart-shaped eccentric and a gear wheel on said driving shaft engaging with said worm gear on said first shaft, a claw driven by said heart-shaped eccentric for intermittently advancing a film through said gate, means for masking said aperture, means for masking each frame of said aperture in said gate, means connected with said main driving shaft for actuating said masking means to mask the entire aperture while the film is advanced and to alternately mask one frame of said aperture and expose the other frame to light passed by the prism while the film is at rest.

5. In a cinematographic apparatus in combination an objective tube provided with an objective, a wedge-shaped refracting prism for deflecting light rays coming from the object to a predetermined degree, a mount for said prism rotatably mounted on said objective tube, the outer portion of said mount forming a gear wheel, an axle, a Geneva and a gear wheel mounted on said axle, said gear wheel engaging with said portion of said mount forming a gear wheel, a shaft, a worm gear and a disc mounted on said shaft, two pins mounted on said disc at a distance corresponding with a quarter of the circumference of said disc, so as to be capable of engaging said Geneva, a film gate having an aperture for exposing two picture frames, a main driving shaft, a heart-shaped eccentric and a gear wheel on said driving shaft, said gear wheel on said driving shaft engaging with the worm gear on said first shaft, a claw driven by said heart-shaped eccentric for intermittently advancing a film through said gate, a step-shaped diaphragm located on said gate, means for actuating said diaphragm mounted on said main driving shaft to cause said diaphragm to mask the aperture in said gate while the claw means advances the film and to alternately mask one frame of said aperture and expose the other frame to light passed by the prism while the film is at rest.

6. In a cinematographic apparatus in combination an objective tube provided with an objective, a wedge-shaped refracting prism for deflecting the light rays coming from the object to a predetermined degree, a mount for said prism rotatably mounted on said objective tube, the outer portion of said mount forming a gear wheel, an axle, a Geneva and a gear wheel mounted on said axle, said gear wheel engaging with said portion of said mount forming a gear wheel, a shaft, a worm gear and a disc mounted on said shaft, two pins mounted on said disc at a distance corresponding with a quarter of the circumference of said disc so as to be capable of engaging said Geneva to intermittently rotate the prism 180°, a film gate having an aperture for exposing two picture frames, a main driving shaft, a heart-shaped eccentric and a gear wheel on said driving shaft, said gear wheel on said driving shaft engaging with said worm gear on said first shaft, a claw driven by said heart-shaped eccentric for intermittently advancing a film through said gate, a step shaped diaphragm located on said gate, means connected with the main driving shaft for actuating said diaphragm to cause said diaphragm to mask the aperture in said gate while the claw means advances the film and to alternately mask one frame and expose the other frame to light passed by the prism while the film is at rest.

7. In a cinematographic apparatus in combination an objective tube, a wedge-shaped refracting prism for deflecting the light rays coming from the object to a predetermined degree, a mount for said prism rotatably mounted on said objective tube, the outer portion of said mount forming a gear wheel, an axle, a Geneva and a gear wheel mounted on said axle, said gear wheel engaging with said portion of said mount forming a gear wheel, a shaft, a worm gear and a disc mounted on said shaft, two pins mounted on said disc at a distance corresponding with a quarter of the circumference of said disc so as to be capable of engaging the Geneva, a film gate having an aperture for exposing two picture frames, a main driving shaft, a heart-shaped eccentric and a gear wheel on said driving shaft, said gear wheel on said driving shaft engaging with the worm gear on said first shaft, a claw driven by said heart-shaped eccentric for intermittently advancing a film through said gate, a step-shaped diaphragm mounted on said gate, a slotted member affixed to said diaphragm, a crank pin mounted on the gear wheel on said driving shaft and engaging the slot in said member, said heart-shaped eccentric and said crank pin being mounted in such a relation that said diaphragm masks the aperture in said gate while the film is advanced and alternately masks one frame and exposes the other to light passed by the prism while the film is at rest.

LEO GOLDHAMMER.